(12) United States Patent
Kubala et al.

(10) Patent No.: US 11,860,371 B1
(45) Date of Patent: Jan. 2, 2024

(54) EYEWEAR WITH EYE-TRACKING REFLECTIVE ELEMENT

(71) Applicants: Kenneth Kubala, Boulder, CO (US); Russell Douglas Patton, Playa Vista, CA (US); Jonathan Rodriguez, La Habra, CA (US)

(72) Inventors: Kenneth Kubala, Boulder, CO (US); Russell Douglas Patton, Playa Vista, CA (US); Jonathan Rodriguez, La Habra, CA (US)

(73) Assignee: Snap Inc., Santa Monica, CA (US)

( * ) Notice: Subject to any disclaimer, the term of this patent is extended or adjusted under 35 U.S.C. 154(b) by 253 days.

(21) Appl. No.: 16/879,873

(22) Filed: May 21, 2020

Related U.S. Application Data

(60) Provisional application No. 62/854,948, filed on May 30, 2019.

(51) Int. Cl.
*G02B 27/01* (2006.01)

(52) U.S. Cl.
CPC ..... *G02B 27/0179* (2013.01); *G02B 27/0172* (2013.01); *G02B 2027/0138* (2013.01); *G02B 2027/0174* (2013.01); *G02B 2027/0178* (2013.01); *G02B 2027/0187* (2013.01)

(58) Field of Classification Search
CPC ............ G02B 27/0179; G02B 27/0172; G02B 2027/0138; G02B 2027/0174; G02B 2027/0178; G02B 2027/0187
See application file for complete search history.

(56) References Cited

U.S. PATENT DOCUMENTS

| 10,698,204 | B1* | 6/2020 | Ouderkirk | G02B 27/0172 |
| 10,838,132 | B1* | 11/2020 | Calafiore | G02B 6/0015 |
| 11,283,236 | B2* | 3/2022 | Ma | G02B 5/288 |
| 2014/0211146 | A1* | 7/2014 | Gupta | G02B 3/12 351/158 |
| 2014/0268328 | A1* | 9/2014 | Dorschner | G02F 1/292 359/484.01 |
| 2014/0285429 | A1* | 9/2014 | Simmons | G02B 27/0179 359/259 |
| 2016/0077336 | A1* | 3/2016 | Hainich | G02B 5/201 345/8 |
| 2016/0238845 | A1* | 8/2016 | Alexander | G02B 27/0172 |
| 2017/0115483 | A1* | 4/2017 | Aleem | G02B 26/101 |
| 2017/0299869 | A1* | 10/2017 | Urey | G03H 1/2294 |
| 2018/0149863 | A1* | 5/2018 | Aleem | G02B 5/32 |
| 2018/0365490 | A1* | 12/2018 | Agrawal | G06V 40/197 |
| 2019/0370450 | A1* | 12/2019 | Fletcher | G02B 27/0093 |
| 2020/0133003 | A1* | 4/2020 | Wang | G06V 40/193 |
| 2020/0166994 | A1* | 5/2020 | Tornéus | G06F 3/013 |
| 2020/0225482 | A1* | 7/2020 | Bodiya | G02B 27/0944 |
| 2021/0041948 | A1* | 2/2021 | Berkner-Cieslicki | G02B 27/1086 |
| 2021/0271320 | A1* | 9/2021 | Fiess | G02B 27/0172 |

(Continued)

*Primary Examiner* — Dmitriy Bolotin
(74) *Attorney, Agent, or Firm* — Culhane Meadows PLLC; Stephen J. Weed

(57) ABSTRACT

An eyewear device including an eye tracker to track a user's eye. The eyewear includes a see-through display for creating an image. The eyewear includes a light source generating a collimated light beam, and the display includes a powered optical element that receives and reflects the light beam. The powered optical element spreads the light beam to uniformly illuminate a user's eye. The powered optical element may include a holographic element.

20 Claims, 14 Drawing Sheets

(56) References Cited

U.S. PATENT DOCUMENTS

2022/0091057 A1\* 3/2022 Gray .................... G01N 27/028
2022/0091323 A1\* 3/2022 Yaroshchuk ....... G02B 6/29304

\* cited by examiner

EYEWEAR WITH EYE-TRACKING REFLECTIVE ELEMENT

CROSS-REFERENCE TO RELATED APPLICATIONS

This application claims priority to U.S. Provisional Application Ser. No. 62/854,948 entitled EYEWEAR WITH EYE-TRACKING REFLECTIVE ELEMENT, filed on May 30, 2019, the contents of which are incorporated fully herein by reference.

TECHNICAL FIELD

The present subject matter relates to see-through displays for an eyewear device, e.g., smart glasses.

BACKGROUND

Portable eyewear devices, such as smart glasses, headwear, and headgear available today integrate cameras and see-through displays. Eye-tracking features may be incorporated into portable eyewear devices to offer additional functionality. Eye-tracking features may place illuminators either in the wearer's field or elsewhere such as in a front frame of the eyewear devices, such as the eye-rim area of glasses.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
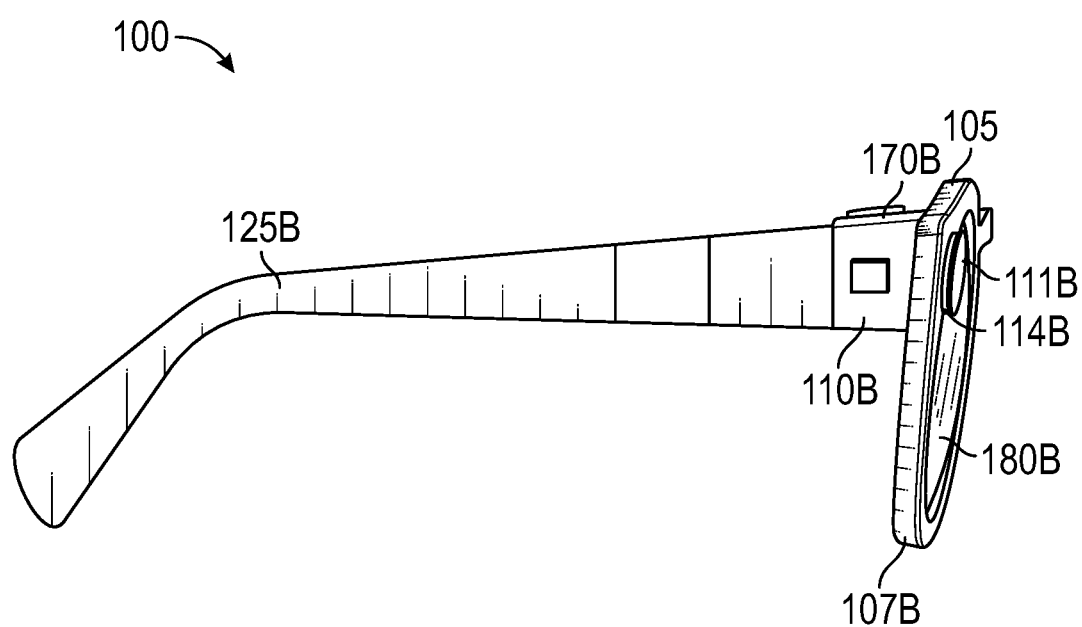
FIG. 1A is a side view of an example hardware configuration of an eyewear device, which shows a right optical assembly with an image display, and field of view adjustments are applied to a user interface presented on the image display based on detected head or eye movement by a user.

In an example, this disclosure includes integrating a collimated infrared light source, for example a vertical cavity surface-emitting laser (VCSEL), in a side of the glasses/AR HMD. This collimated light source emits light forward to the see-through display assembly or front lens of the glasses/AR HMD. The front lens/display element incorporates an optical element, such as an optically powered holographic element, that reflects the incident infrared collimated light source backwards towards the wearer's eye and the powered nature of the element spreads out the collimated beam to uniformly illuminate the wearer's eye. This provides substantially uniform infrared illumination over the eye iris and pupil that allows the eye tracking system (which operates using infrared imaging) to operate.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye tracker and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Consistent non-visible light illumination, such as infrared illumination, is required for many eye tracking solutions to achieve a stable/reliable tracking result. Multiple illuminate sources located in front area of glasses provide good illumination of iris and is a simple solution. Industrial design and engineering constraints may make it difficult to place light emitting diodes (LEDs) in these locations, especially in lightweight eyewear form factors. If illuminators are placed in transparent region of the eye-lens, the illuminators may introduce artifacts to the user or see-through display in a head mounted display (HMD), such as an augmented reality (AR) device.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view of an example hardware configuration of an eyewear device 100, which includes a right optical assembly 180B with an image display, that provides visual area adjustments to a user interface presented on the image display based on detected head or eye movement by a user. Eyewear device 100 includes multiple visible light cameras 114A-B that form a stereo camera, of which the right visible light camera 114B is located on a right chunk 110B.

In the example of FIG. 1A, the left and right visible light cameras 114A-B are sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generate images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 11) for digital processing along with a timestamp in which the image of the scene is captured. Image processor 912 includes circuitry to receive signals from the visible light camera 114A-B and process those signals from the visible light camera 114 into a format suitable for storage in the memory. The timestamp can be added by the image processor or other processor, which controls operation of the visible light cameras 114A-B. Visible light cameras 114A-B allow the stereo camera to simulate human binocular vision. Stereo camera provides the ability to reproduce three-dimensional images based on two captured images from the visible light cameras 114A-B having the same timestamp. Such three-dimensional images allow for an immersive life-like experience, e.g., for virtual reality or video gaming. For stereoscopic vision, a pair of images is generated at a given moment in time—one image for each of the left and right visible light cameras 114A-B. When the pair of generated images from the frontward facing angles of coverage 111A-B of the left and right visible light cameras 114A-B are stitched together (e.g., by the image processor), depth perception is provided by the optical assembly 180A-B.

In an example, a user interface field of view adjustment system includes the eyewear device 100. The eyewear device 100 includes a frame 105, right chunk 110B extending from a right lateral side 170B of the frame 105, right temple 125B extending from right chunk 110B, and a see-through image display 180D (FIGS. 2A-C) comprising optical assembly 180B to present a graphical user interface to a user. The eyewear device 100 includes a left visible light camera 114A connected to the frame 105 or a left chunk 110A to capture a first image of the scene. Eyewear device 100 further includes a right visible light camera 114B connected to the frame 105 or the right temple 110B to capture (e.g., simultaneously with the left visible light camera 114A) a second image of the scene which partially overlaps the first image. Although not shown in FIGS. 1A-B, the user interface field of view adjustment system further includes a processor (element 932 of FIG. 11) coupled to the eyewear device 100 and connected to the visible light cameras 114A-B, a memory (element 934 of FIG. 11) accessible to the processor 932, and programming in the memory (element 934 of FIG. 11), for example in the eyewear device 100 itself or another part of the user interface field of view adjustment system.

Figure 1B:
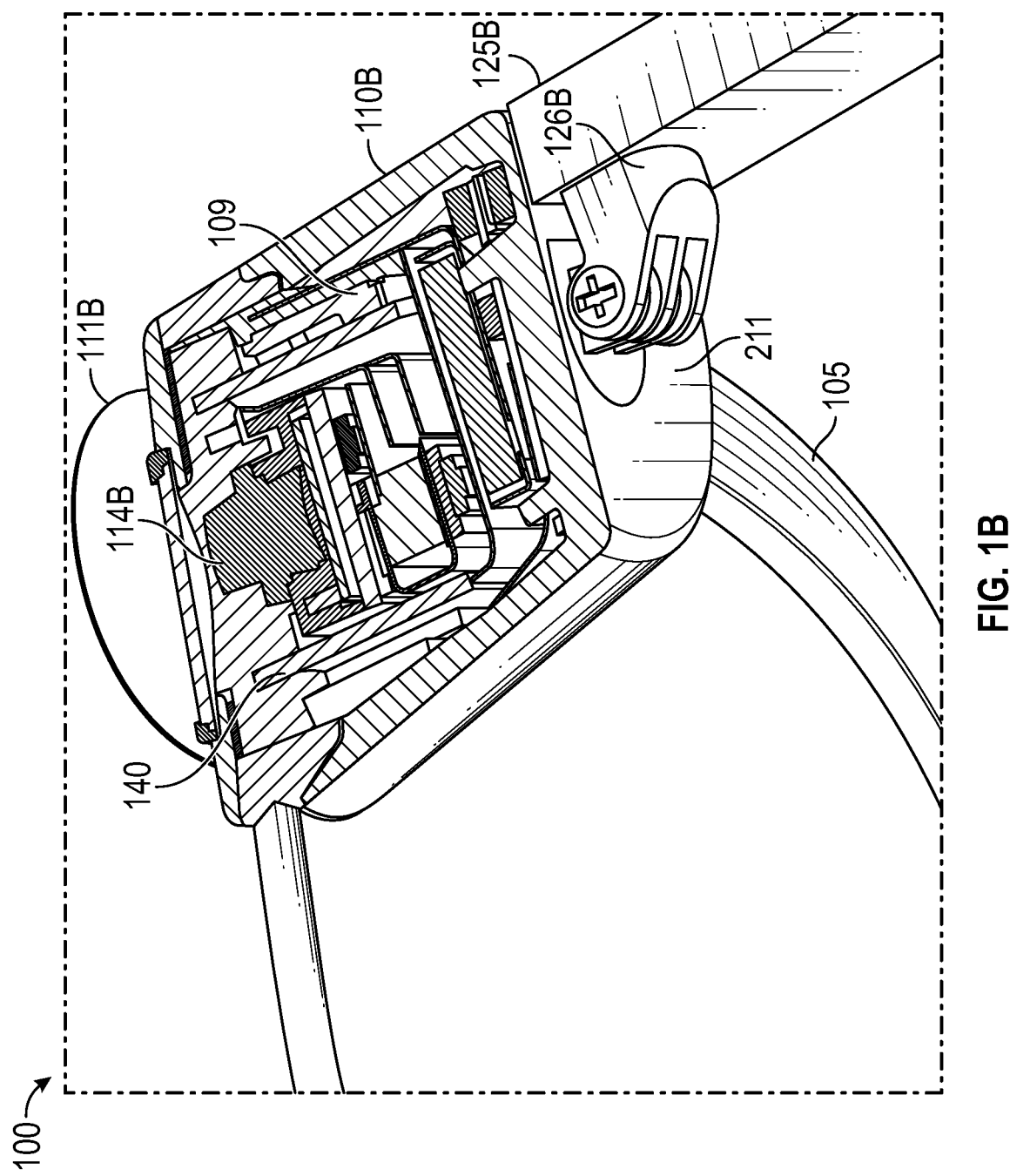
FIG. 1B is a top cross-sectional view of a chunk of the eyewear device of FIG. 1A depicting a visible light camera, a head movement tracker for tracking the head movement of the user of the eyewear device, and a circuit board.
Figure 2A:
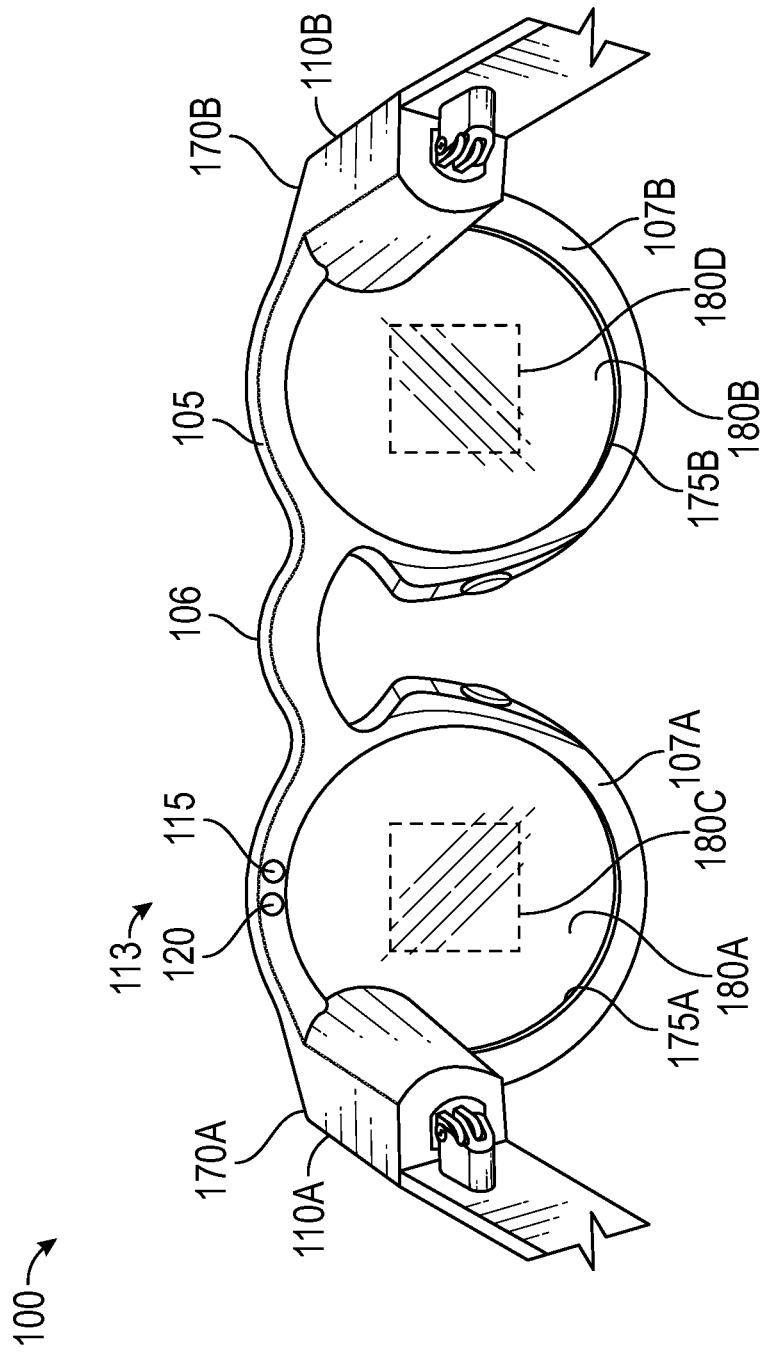
FIG. 2A is a rear view of an example hardware configuration of an eyewear device, which includes an eye tracker on a frame.
Figure 2B:
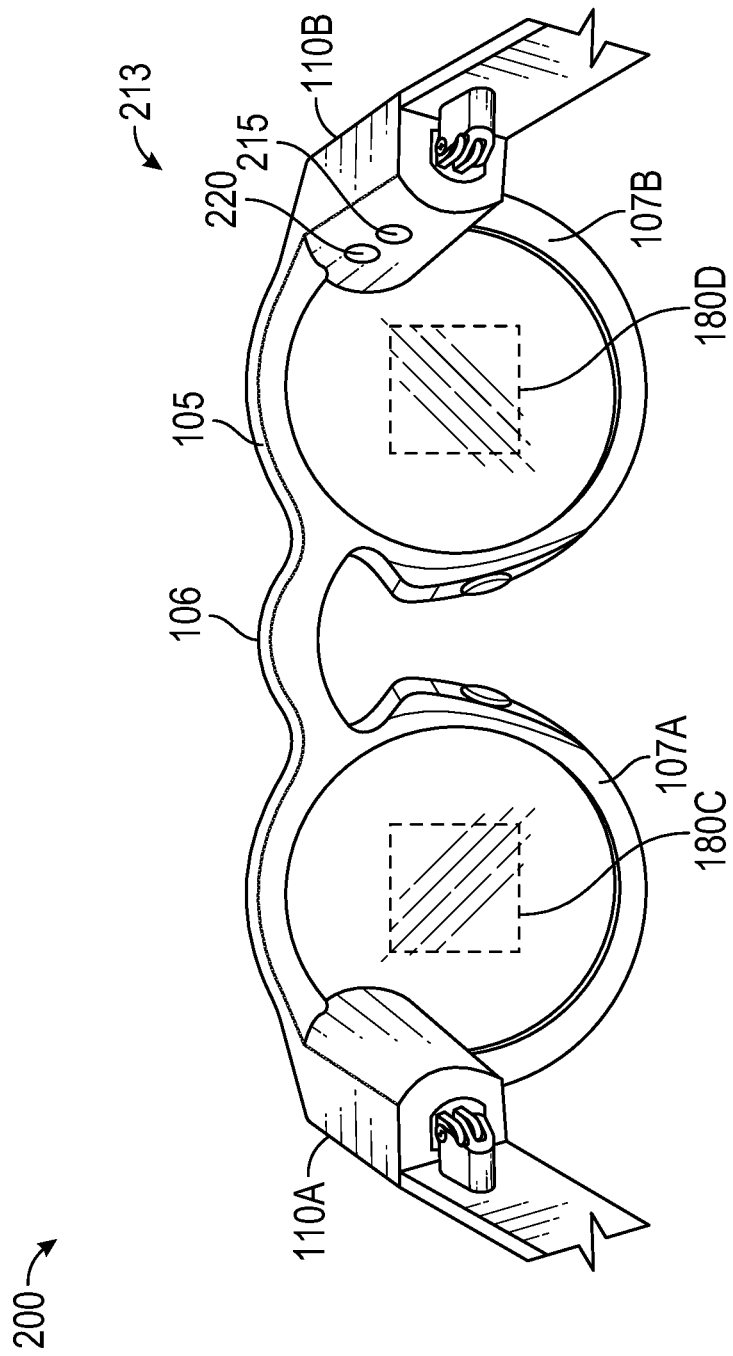
FIG. 2B is a rear view of an example hardware configuration of another eyewear device, which includes an eye tracker on a chunk, for use in a system for identifying a user of the eyewear device.
Figure 5:
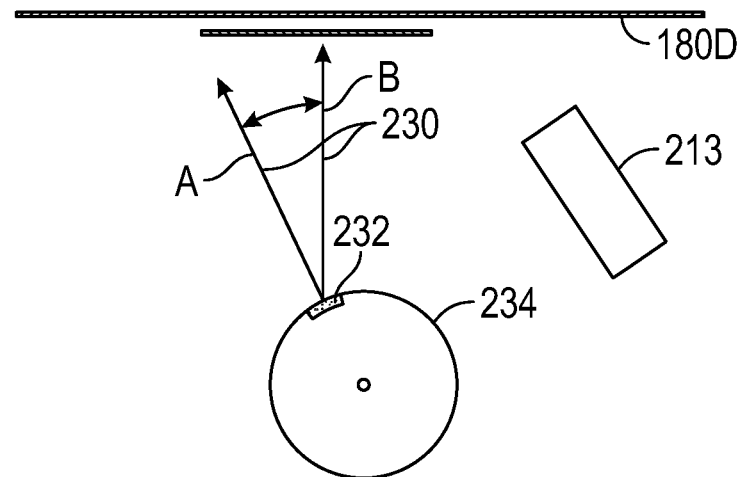
FIG. 5 illustrates determining an eye gaze direction of a user.
Figure 7:
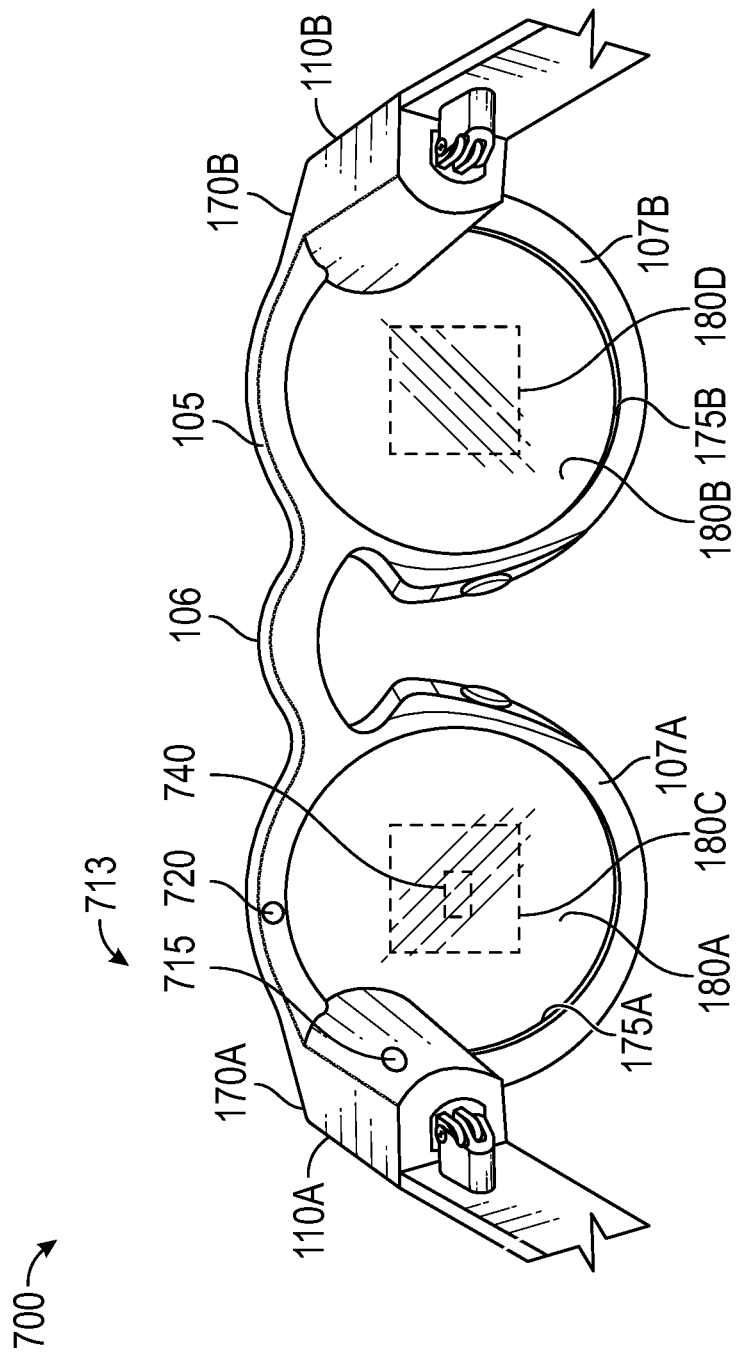
FIG. 7 is a rear view of an example hardware configuration of an eyewear device, which includes an eye tracker on a frame, where the display includes a powered optical element.

Although not shown in FIG. 1A, the eyewear device 100 also includes a head movement tracker (element 109 of FIG. 1B) or an eye movement tracker (element 113 of FIG. 2A, element 213 of FIG. 2B, and element 713 of FIG. 7). Eyewear device 100 further includes the see-through image displays 180C-D of optical assembly 180A-B for presenting a sequence of displayed images, and an image display driver (element 942 of FIG. 11) coupled to the see-through image displays 180C-D of optical assembly 180A-B to control the image displays 180C-D of optical assembly 180A-B to present the sequence of displayed images, which are described in further detail below. Eyewear device 100 further includes the memory (element 934 of FIG. 11) and the processor (element 932 of FIG. 11) having access to the image display driver (element 942 of FIG. 11) and the memory (element 934 of FIG. 11). Eyewear device 100 further includes programming in the memory (element 934 of FIG. 11). Execution of the programming by the processor (element 932 of FIG. 11) configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (FIG. 5).

Execution of the programming by the processor (element 932 of FIG. 11) further configures the eyewear device 100 to detect movement of a user of the eyewear device by: (i) tracking, via the head movement tracker (element 109 of FIG. 1B), a head movement of a head of the user, or (ii) tracking, via the eye movement tracker (element 113 of FIG. 2A, element 213 of FIG. 2B, FIG. 5 and FIG. 6, and element 713 of FIG. 7), an eye movement of an eye of the user of the eyewear device 100. Execution of the programming by the processor (element 932 of FIG. 11) further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor (element 932 of FIG. 11) further configures the eyewear device 100 to generate a successive displayed image of the sequence of displayed images based on the field of view adjustment. Execution of the programming by the processor (element 932 of FIG. 11) further configures the eyewear device 100 to present, via the see-through image displays 180C-D of the optical assembly 180A-B, the successive displayed image.

FIG. 1B is a top cross-sectional view of the right chunk 110B of the eyewear device 100 of FIG. 1A depicting the right visible light camera 114B, a head movement tracker 109, and a circuit board. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The right hinge 126B connects the right chunk 110B to the right temple 125B of the eyewear device 100. In some examples, components of the right visible light camera 114B, the flexible PCB 140, or other electrical connectors or contacts may be located on the right temple 125B or the right hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means ±10% from the stated amount.

Variation along the horizontal axis slides three-dimensional objects, such as characters, bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s), low-power wireless circuitry (e.g., for wireless short-range network communication via Bluetooth™), high-speed wireless circuitry (e.g., for wireless local area network communication via WiFi).

The right visible light camera 114B is coupled to or disposed on the flexible PCB 140 and covered by a visible light camera cover lens, which is aimed through opening(s) formed in the right chunk 110B. In some examples, the frame 105 connected to the right chunk 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing angle of coverage 111B with a line of sight or perspective of the right eye of the user of the eyewear device 100. The visible light camera cover lens can also be adhered to an outward facing surface of the right chunk 110B in which an opening is formed with an outwards facing angle of coverage, but in a different outwards direction. The coupling can also be indirect via intervening components.

Left (first) visible light camera 114A is connected to the left see-through image display 180C of left optical assembly 180A to generate a first background scene of a first successive displayed image. The right (second) visible light camera 114B is connected to the right see-through image display 180D of right optical assembly 180B to generate a second background scene of a second successive displayed image. The first background scene and the second background scene partially overlap to present a three-dimensional observable area of the successive displayed image.

Flexible PCB 140 is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

FIG. 2A is a rear view of an example hardware configuration of an eyewear device 100, which includes an eye tracker 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left chunk 110A adjacent the left lateral side 170A of the frame 105 and the right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples 125A and 125B (not shown) attached to the frame 105. The left chunk 110A and the left temple 125A are collectively referred to as the eyewear left side, and the right chunk 110B and the right temple 125B are collectively referred to as the eyewear right side.

In the example of FIG. 2A, the eye tracker 113 includes an infrared emitter 115 and an infrared camera 120. Visible light cameras typically include an infrared (IR) blocking filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared camera 120 does receive IR light form emitter 115. The infrared emitter 115 and the infrared camera 120 are co-located on the frame 105, for example, both are shown as connected to the upper portion of the left rim 107A. The frame 105 or one or more of the left and right chunks 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105, for example, the infrared emitter 115 is on the left rim 107A and the infrared camera 120 is on the right rim 107B. In another example, the infrared emitter 115 is on the frame 105 and the infrared camera 120 is on one of the chunks 110A-B, or vice versa. The infrared emitter 115 can be connected essentially anywhere on the frame 105, left chunk 110A (emitter 715 in FIG. 7), or right chunk 110B (emitter 215 in FIG. 2B) to emit a pattern of infrared light. Similarly, the infrared camera 120 can be connected essentially anywhere on the frame 105, left chunk 110A, or right chunk 110B (camera 220 in FIG. 2B) to capture at least one reflection variation in the emitted pattern of infrared light from the illuminated pupil/iris.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the chunks 110A-B at either ends of the frame 105.

FIG. 2B is a rear view of an example hardware configuration of another eyewear device 200. In this example configuration, the eyewear device 200 is depicted as including an eye tracker 213 on a right chunk 110B. As shown, an infrared emitter 215 and an infrared camera 220 are co-located on the right chunk 110B. It should be understood that the eye tracker 213 or one or more components of the eye tracker 213 can be located on the left chunk 110A and other locations of the eyewear device 100, for example, the frame 105. The infrared emitter 215 and infrared camera 220 are like that of FIG. 2A, but the eye tracker 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106; and the left and right rims 107A-B include respective apertures which hold the respective optical elements 180A-B comprising the see-through display 180C-D.

Figure 2C:
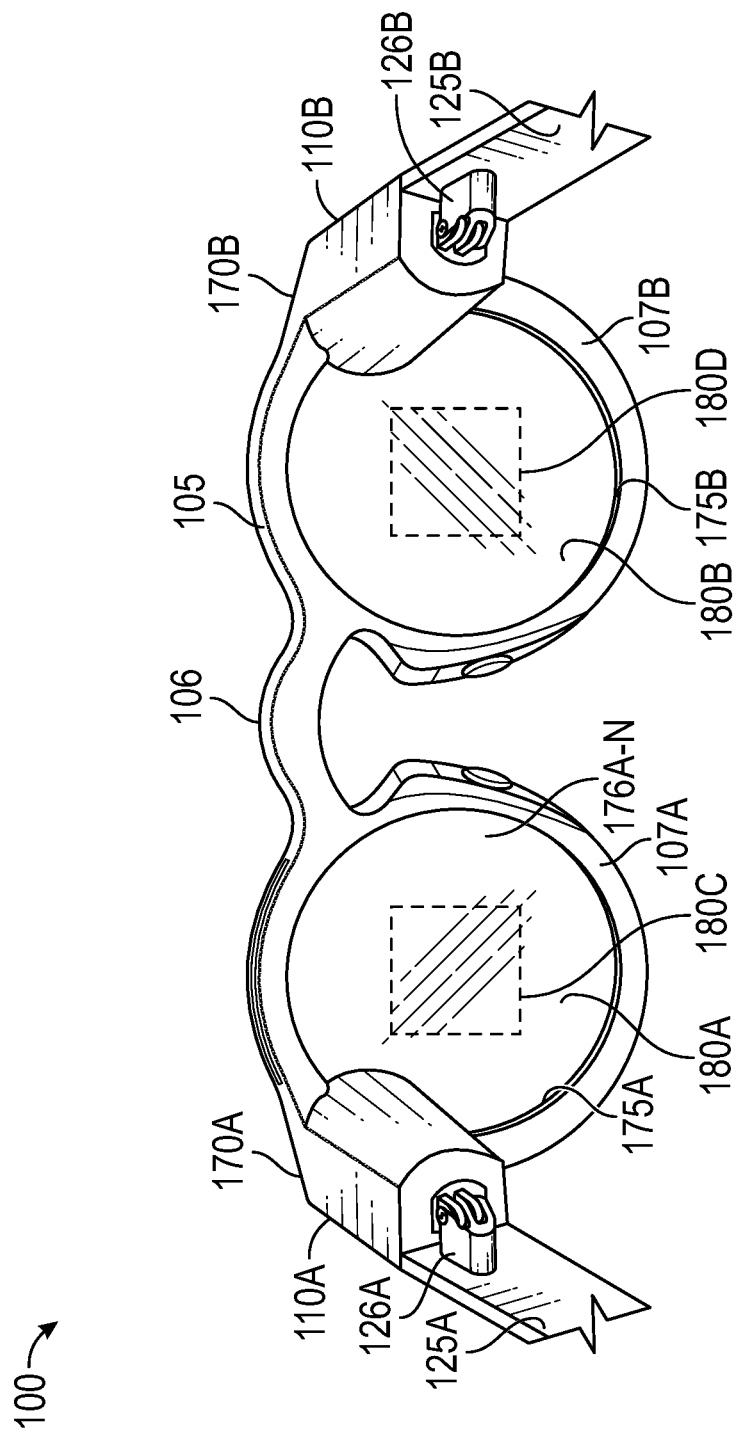
FIGS. 2C and 2D are rear views of example hardware configurations of the eyewear device, including two different types of image displays.
Figure 2D:
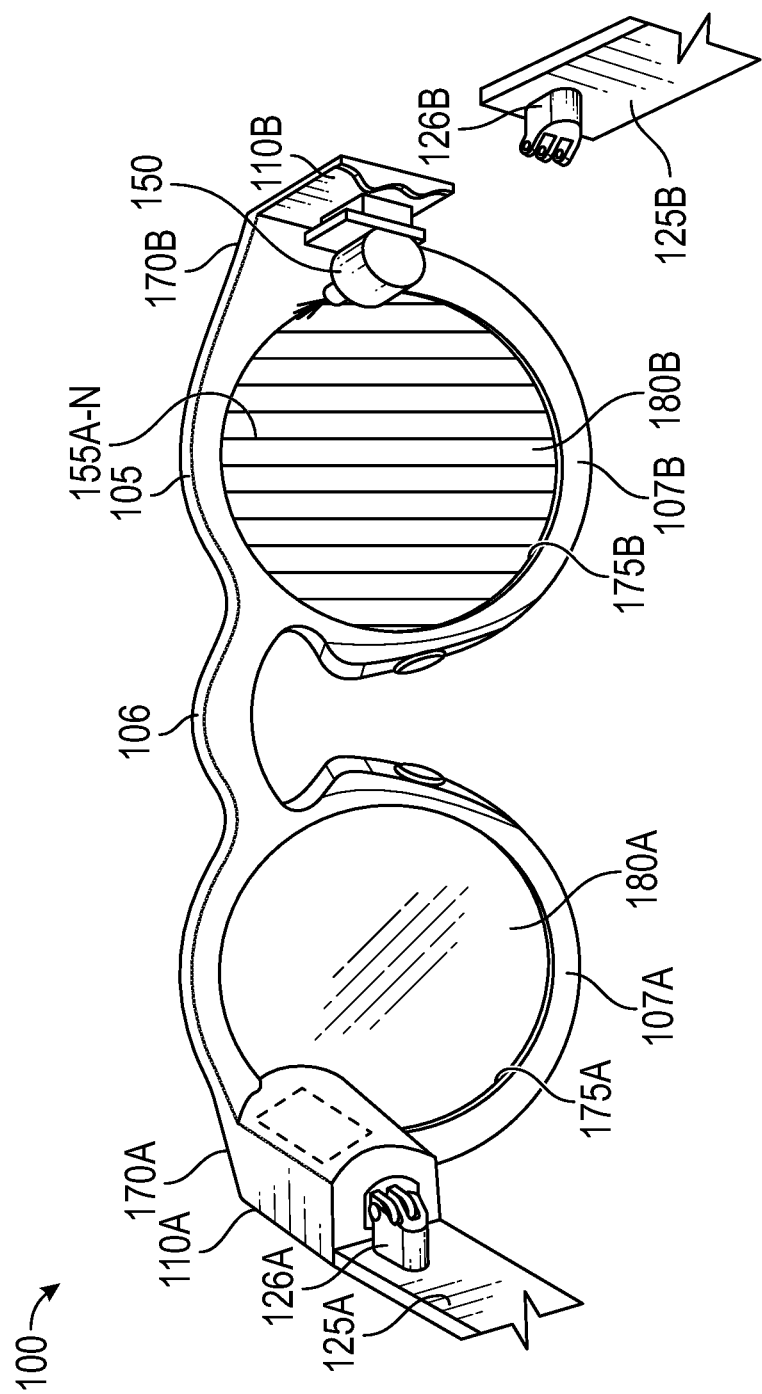

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B includes a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical assembly 180A-B. The first optical assembly 180A includes the first see-through image display 180C (e.g., a display matrix of FIG. 2C or optical strips 155A-N' and a projector 150A). The second optical assembly 180B includes the second see-through image display 180D e.g., a display matrix of FIG. 2C or optical strips 155A-N" and a projector 150B). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (a reduction in brightness or saturation at the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
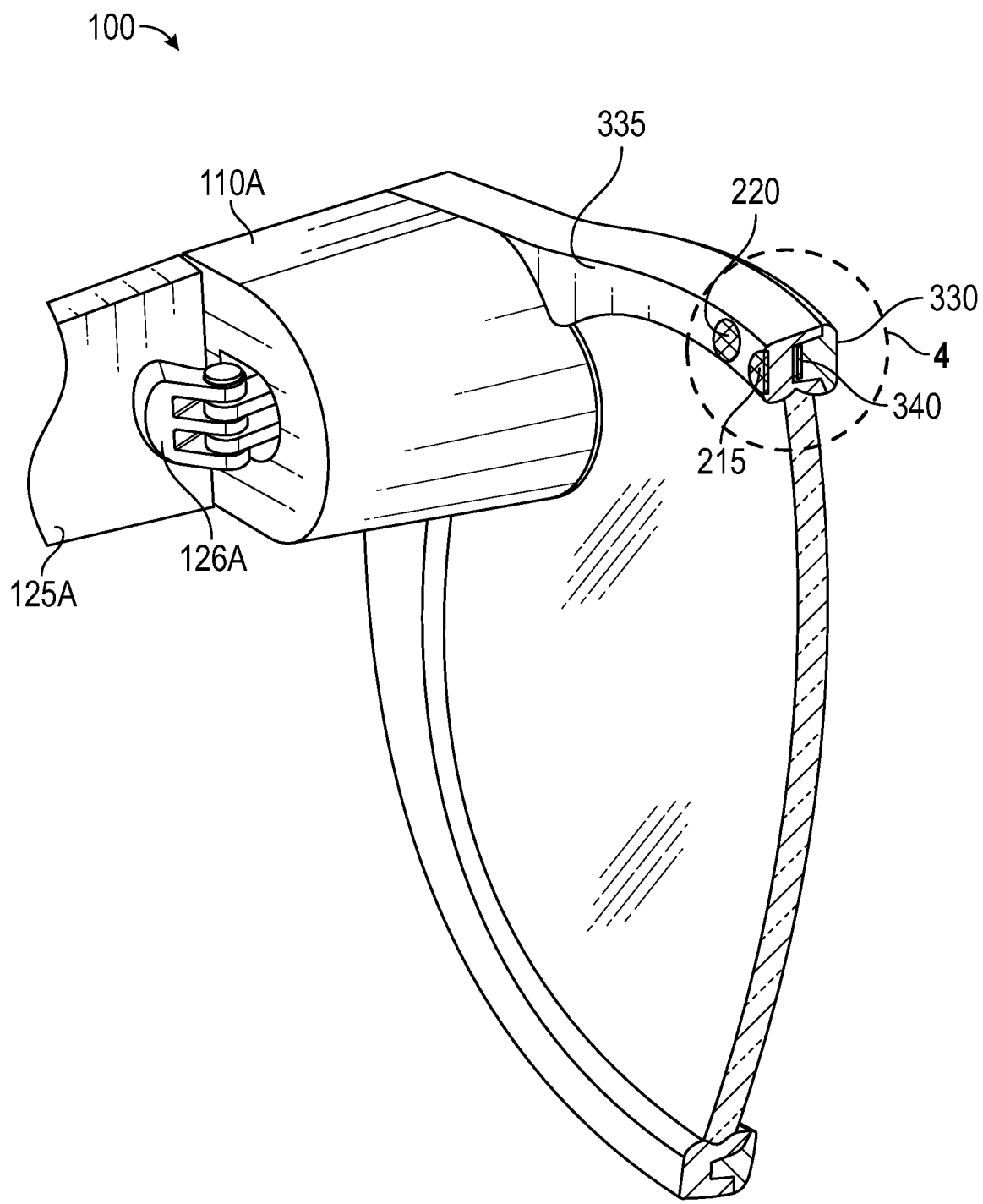
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left chunk 110A to the left temple 125A via the left hinge 126A. In some examples, components of the eye movement tracker 213, including the infrared emitter 215, the flexible PCB 340, or other electrical connectors or contacts may be located on the left temple 125A or the left hinge 126A.

Figure 4:
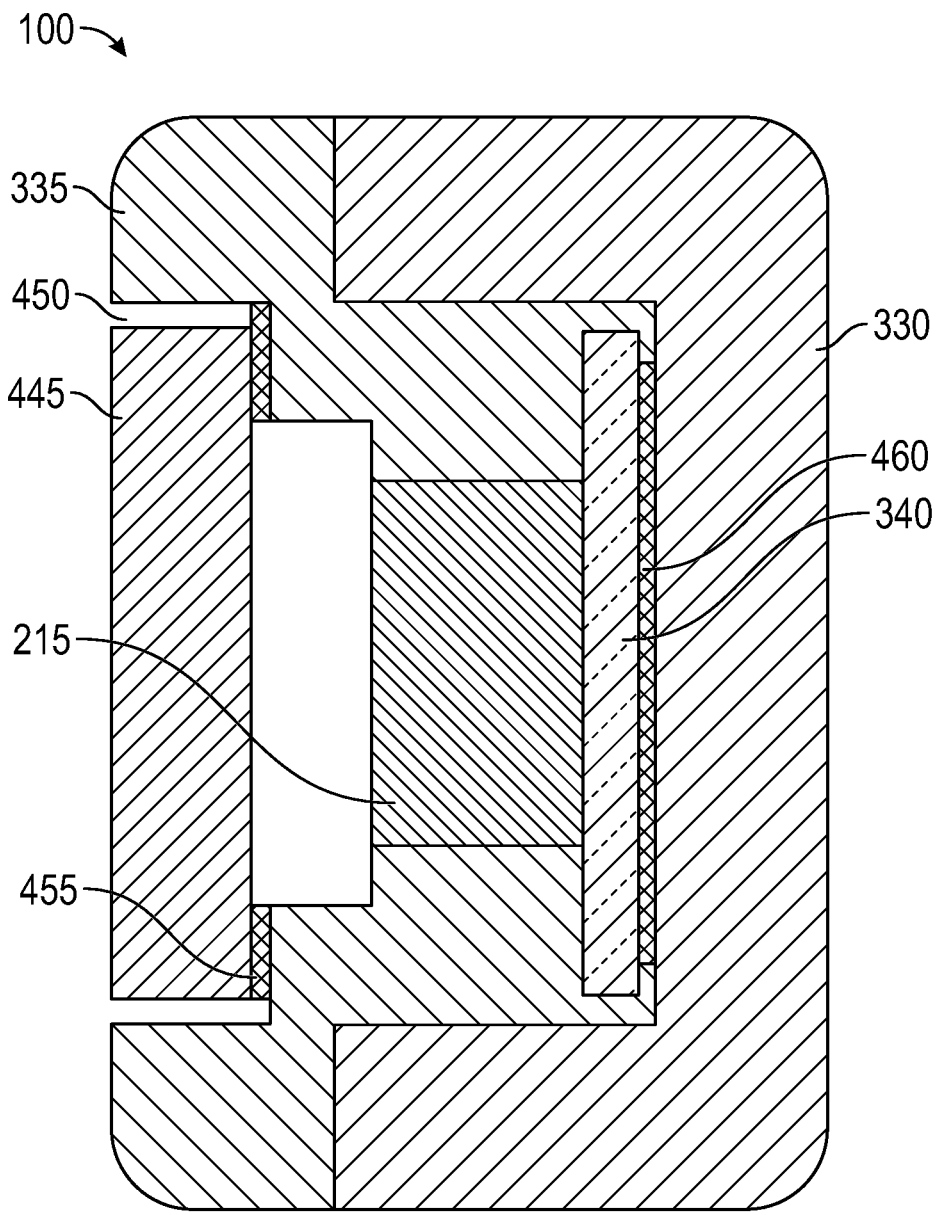
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 6:
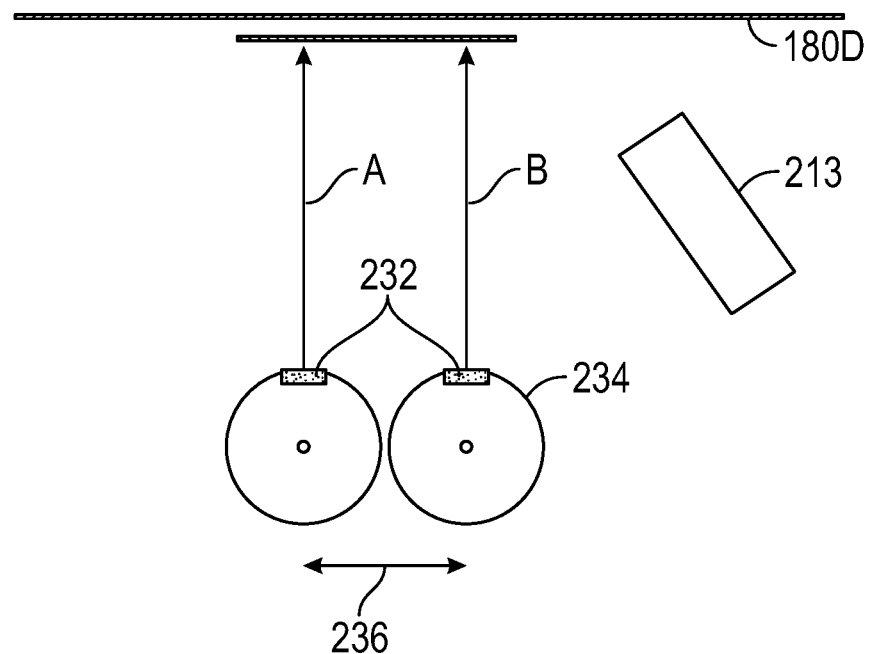
FIG. 6 illustrates determining an eye position of the user.

In an example, the processor (element 932 of FIG. 11) utilizes tracker 213 to determine an eye gaze direction 230 of a wearer as shown in FIG. 5, and an eye position 236 of the wearer within an eyebox as shown in FIG. 6. The eye tracker 213 is a tracker which uses infrared light illumination (e.g., near-infrared, short-wavelength infrared, mid-wavelength infrared, long-wavelength infrared, or far infrared) to captured image of reflection variations of infrared light from the eye to determine the gaze direction 230 of a pupil 232 of an eye 234, and also the eye position 236 with respect to the see-through display 180D.

FIG. 7 is a rear view of an example hardware configuration of another eyewear device 700 that is similar to eyewear device 100 shown in FIG. 2A and eyewear device 200 shown in FIG. 2B. In this example configuration, the eyewear device 700 is depicted as including an eye tracker 713 located on a left chunk 110A and frame 105. As shown, an infrared emitter 715 is located on the left chunk 110A, and a visible camera 720 is located on the left side of frame 105. It should be understood that the eye tracker 713 or one or more components of the eye tracker 713 can be located on the right chunk 110B and the right side of the frame 105. In another example, the infrared emitter 715 may be located on the left temple 125A or the right temple 125B.

Figure 8:
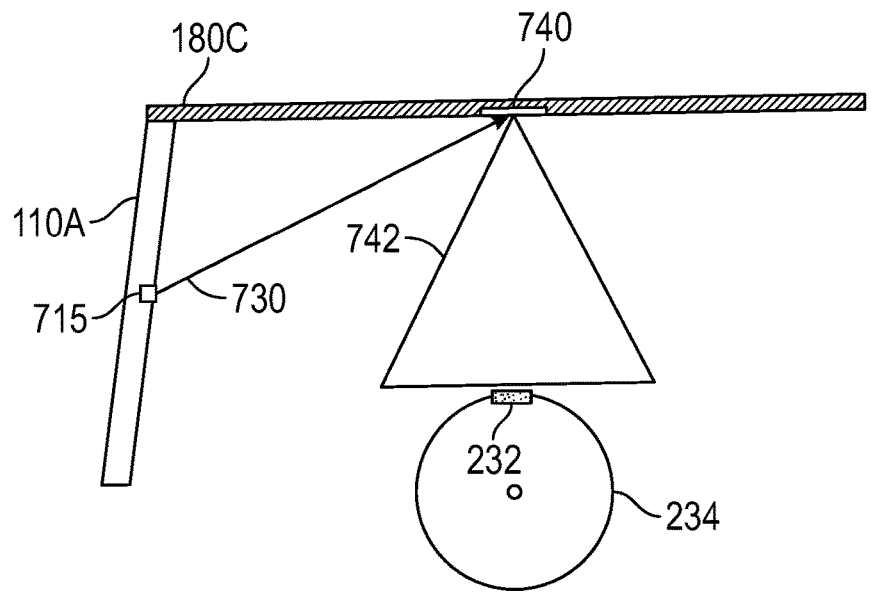
FIG. 8 illustrates the powered optical element receiving an incident light beam from an infrared emitter and spreading the light beam to uniformly illuminate a user's eye.

In this example, as shown in FIG. 8, the infrared emitter 715 emits a collimated infrared light beam 730 that is directed towards the inside surface of optical assembly 180A. The optical assembly 180A further includes a powered optical element 740 at a central portion thereof that is configured to reflect the incident collimated infrared light beam 730 toward the eye of the user. The term powered means optical power in this disclosure. The powered optical element 740 may comprise a reflective holographic element. In other examples, the powered optical element 740 may comprise an infrared non-visible switch.

The collimated infrared light emitter 715 may include a vertical cavity surface-emitting laser (VCSEL), which is relatively inexpensive and small. Only a single light source is used while still achieving highly uniform illumination of the eye. A LED with or without a focusing lens can also be used as the infrared light emitter 715, but a LED with a focusing lens generally has a larger size.

The holographic element 740 reduces the impact to transmissivity of display 180C and the impact to the projected image from display 180C. The optically powered nature of the holographic element 740 shapes the incident light beam 730, and spreads out the collimated beam as shown 742 to uniformly illuminate the wearer's eye 234. This spread beam 730 provides substantially uniform infrared illumination over the eye 234 that allows the eye tracker 713 (which operates using infrared imaging) to operate. The holographic element 740 is tuned to the wavelength of the collimated light beam 730, and is also tuned to the specific angle of the incident collimated light beam 730 with respect to the holographic element 740.

Figure 9:
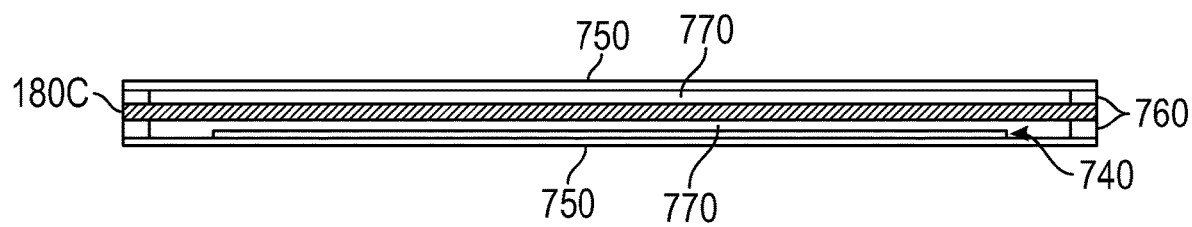
FIG. 9 illustrates a side section view of the powered optical element attached to the display.

FIG. 9 illustrates a side sectional view of the optically powered element 740, such as the holographic element 740, coupled to the display 180C. The holographic element 740 may comprise a planar layer laminated to an inside surface of a front transparent protective cover 750, and is parallel to, but spaced from, display 180C. The left display 180C is sandwiched between a rear protective cover 750 and the front protective cover 750, and is spaced from each protective cover 750 by a respective spacer member 760 to form a respective air gap 770 therebetween a shown. The optically powered element 740 may also be coupled to the right display 180D, as previously discussed.

Figure 10:
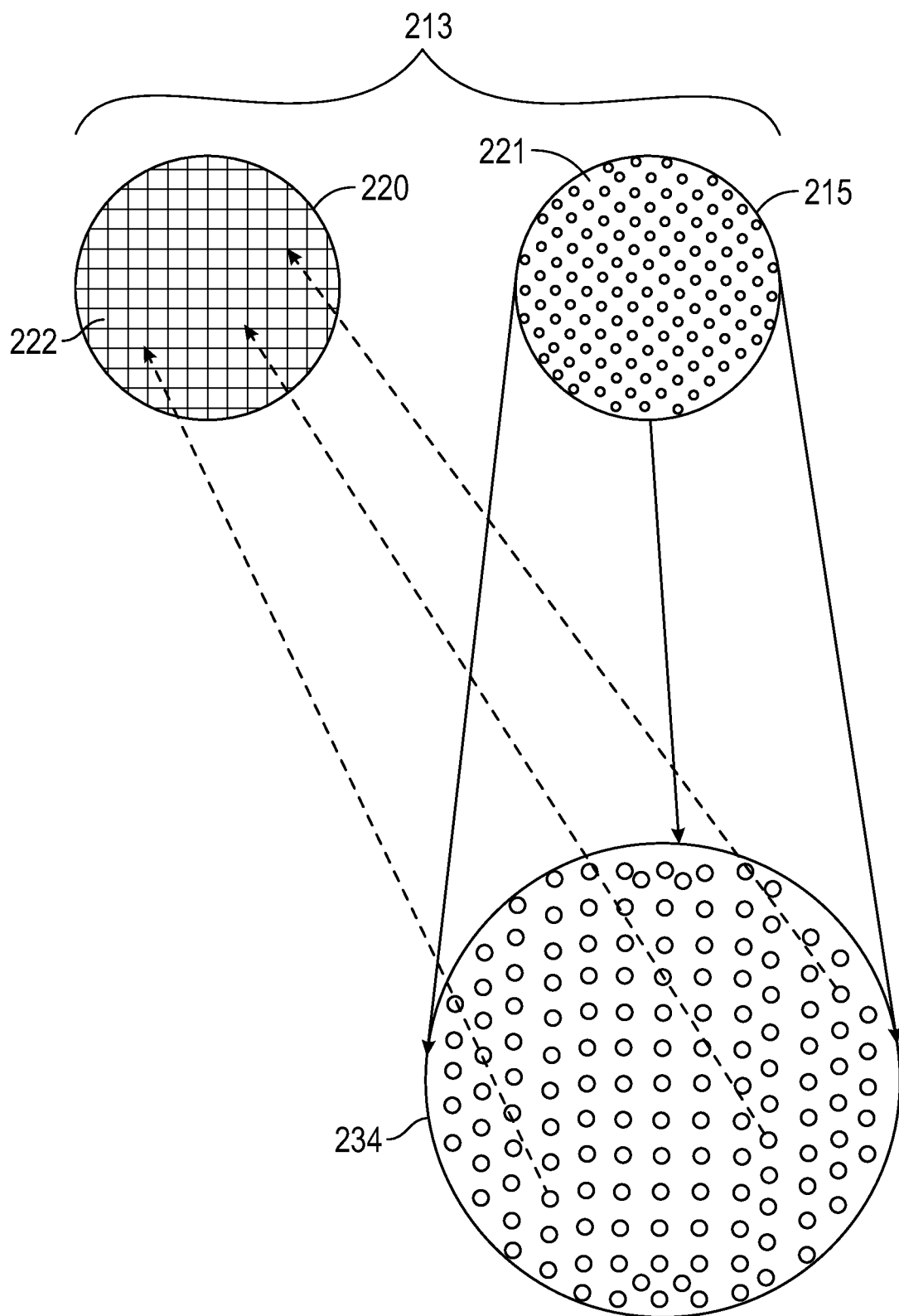
FIG. 10 illustrates an example of a pattern of infrared light emitted by the infrared emitter of the eyewear device for determining eye gaze direction and eye position.

FIG. 10 depicts an example of a pattern of infrared light emitted by the infrared emitter 215 of the eye tracker 213 and reflection variations of the emitted pattern of infrared light captured by the infrared camera 220 of the eyewear device. FIG. 10 depicts the emitted pattern of infrared light 221 emitted by the infrared emitter 215 of the eyewear device in an inward facing field of view towards the eye 234 of a wearer.

The pattern of infrared light 221 can be a standardized matrix or beam of pixels that outline a uniform light trace on the eye 234 of the wearer. When the emitted pattern of infrared light 221 strikes the eye 234 of the wearer, the infrared camera 220 captures the reflection variations of the emitted pattern of infrared light 222, which reflection variations are then used by the processor to dynamically and automatically determine the eye gaze direction 230 as shown in FIG. 5, and the eye position 236 within an eyebox as shown in FIG. 6 with respect to the see-through display 180D.

Figure 11:
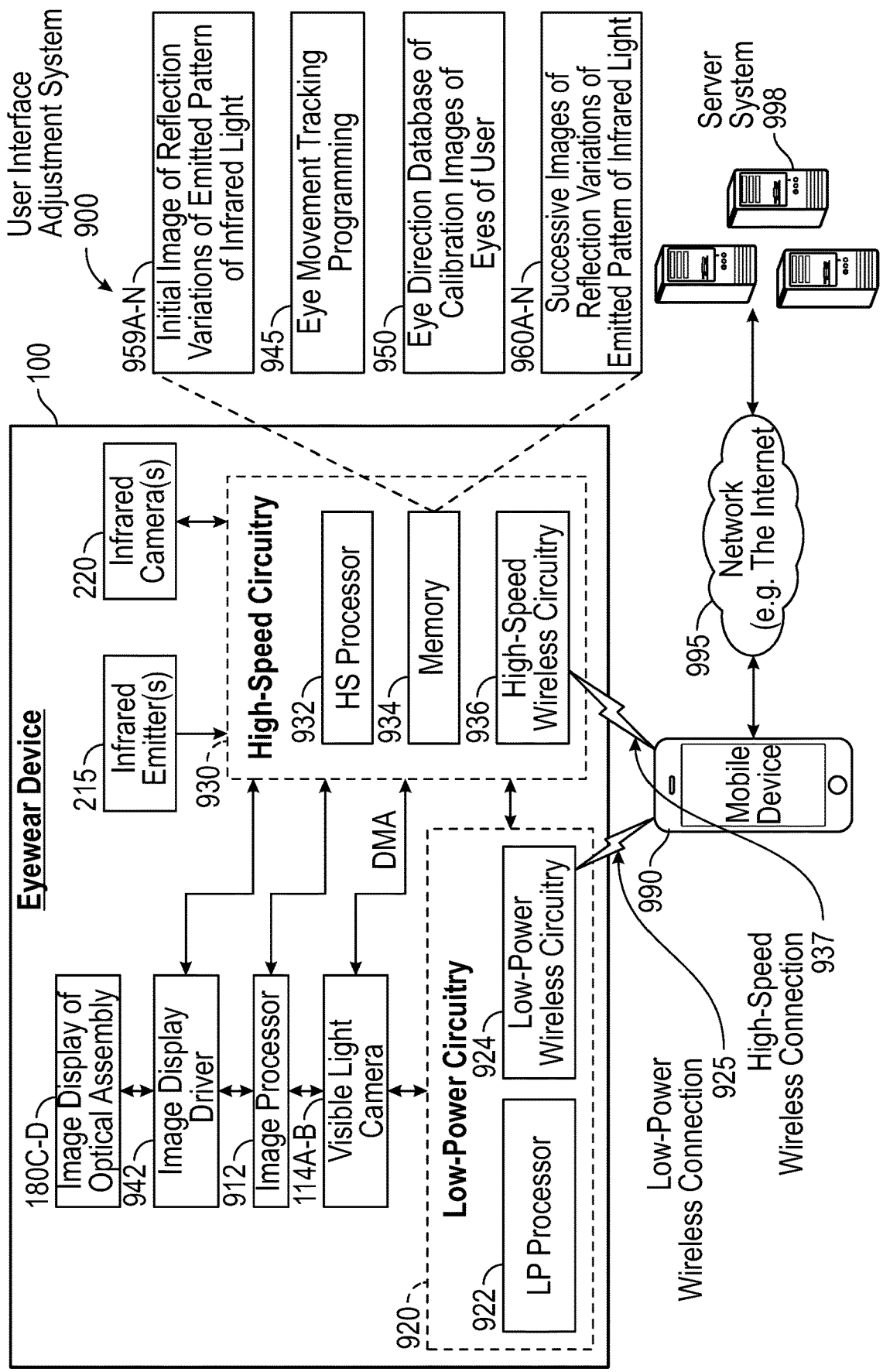
FIG. 11 shows a block diagram of electronic components of the eyewear device.

FIG. 11 depicts a high-level functional block diagram including example electronic components disposed in eyewear 100, 200 and 700. The illustrated electronic components include the processor 932, and the memory 934, which includes static memory, dynamic memory, or a combination thereof, and which includes the plurality of digital color maps including data indicative of the characterization of the see-through display 180D as previously described. These color maps are retrieved and used by processor 932 to create the color masks that compensate pixels of the see-through display 180C-D as a function of the user's eye gaze direction and position with respect to the see-through display 180D so that the user perceives a uniform color and brightness of the display as discussed previously.

Processor 932 includes instructions for execution by processor 932 to implement functionality of eyewear 100, 200 and 700. Processor 932 receives power from battery (not shown) and executes instructions stored in memory 934, or integrated with the processor 932 on-chip, to perform functionality of eyewear 100, 200 and 700 such as image processing of see-through display 180D, controlling operation of eyewear 100, 200 and 700, and communicating with external devices via wireless connections.

A user interface adjustment system 900 includes a wearable device, which is the eyewear device 100, 200 and 700 with an eye movement tracker 113, 213 and 713, respectively (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100, 200 and 700 each include at least two visible light cameras 114A-B (one associated with the left lateral side 170A and one associated with the right lateral side 170B). Eyewear device 100, 200 and 700 further include two see-through image displays 180C-D of the optical assembly 180A-B (one associated with the left lateral side 170A and one associated with the right lateral side 170B). Eyewear device 100, 200 and 700 also includes image display driver 942, image processor 912, low-power circuitry 920, and high-speed circuitry 930. The components shown in FIG. 11 for the eyewear device 100, 200, 700 are located on one or more circuit boards, for example a PCB or flexible PCB, in the temples. Alternatively, the depicted components can be located in the chunks, frames, hinges, or bridge of the eyewear device 100, 200 and 700. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Memory 934 includes an eye direction database of calibrated images of eyes of the user 950 that are captured during the calibration procedure of the eye movement tracker 113, 213 and 713. Memory 934 further includes initial images of reflection variations of the emitted pattern of infrared light 959A-N and successive images of reflection variations of emitted pattern of infrared light 960A-N. Memory 934 further includes eye movement tracking programming 945 to perform the functions described herein, including the user interface field of view adjustment interactions with the displayed content presented on left and right see-through image displays 180C-D of optical assembly 180A-B.

Eye movement tracking programming 945 implements the user interface field of view adjustment instructions, including, to cause the eyewear device 100, 200 and 700 to track, via the eye movement tracker 113, 213, and 713, the eye movement of the eye of the user of the eyewear device 100, 200, 700. Other implemented instructions (functions) cause the eyewear device 100, 200, 700 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 934 to present the sequence of displayed images, including the initial displayed image with the initial field of view and the successive displayed image with the successive field of view.

As shown in FIG. 11, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100, 200, 700 and the operating system is stored in memory 934 for execution. In addition to any other responsibilities, the high-speed processor 932 executing a software architecture for the eyewear device 100, 200, 700 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100, 200, 700 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, 200, 700, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other embodiments, memory 934 may be an independent standalone element of the eyewear device 100, 200, 700. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and eyewear device 100, 200, 700. Eyewear device 100, 200, 700 is connected with a host computer. For example, the eyewear device 100, 200, 700 is paired with the mobile device 990 via the high-speed wireless connection 937 or connected to the server system 998 via the network 995.

Output components of the eyewear device 100, 200, 700 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100, 200, 700 further include acoustic components (e.g., speakers), haptic components (e.g., a vibratory motor), other signal generators, and so forth. The input components of the eyewear device 100, 200, 700, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100, 200, 700 may optionally include additional peripheral device elements 919. Such peripheral device elements may include biometric sensors, additional sensors, or display elements integrated with eyewear device 100, 200, 700. For example, peripheral device elements 919 may include any I/O components including output components, motion components, position components, or any other such elements described herein.

For example, the biometric components of the user interface field of view adjustment 900 include components to detect expressions (e.g., hand expressions, facial expressions, vocal expressions, body gestures, or eye tracking of an iris), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some embodiments, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

Figure 12:
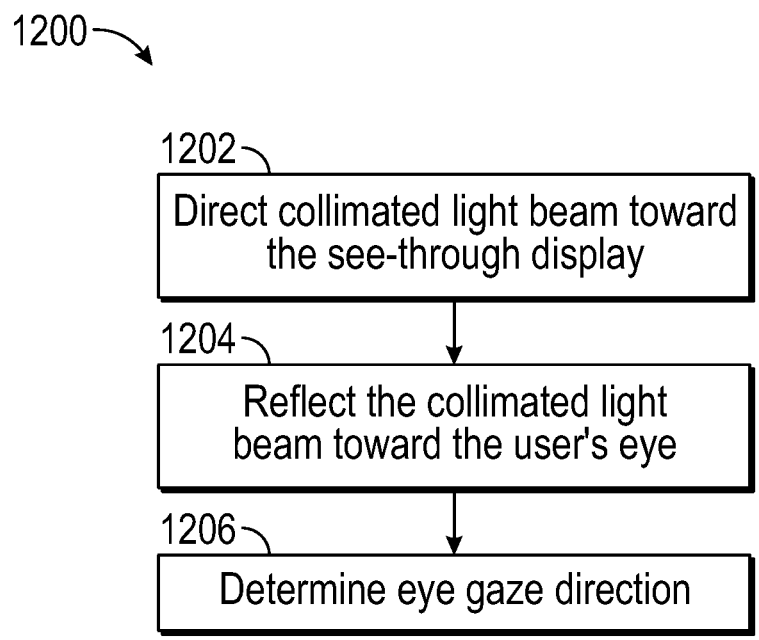
FIG. 12 is a flowchart of a method of using the light beam and the reflected and spread light beam from the optical powered element integrated with the display.

Referring to FIG. 12, there is shown a method 1200 for determining a user's eye gaze direction 230 (FIG. 5) using the collimated light beam 730 and the reflected and spread light beam 742 from the optical powered element 740 integrated with the display 180C, as shown in FIG. 8.

At block 1202, the infrared light emitter 715 emits the collimated light beam 730, and directs the collimated light beam 730 toward the powered optical element 740 included in the display 180C. The collimated light beam 730 allows the light beam to only illuminate the powered optical element 740, and does not otherwise spread or illuminate other portions of the display 180C or eyewear 700. As shown in FIG. 7, the infrared light emitter 715 may be located in the left chunk 110A. In other examples, the infrared light emitter 715 can be located in the left temple 125A, or the frame 105.

At block 1204, the optical powered element 740 reflects the incident collimated light beam 730 toward the user's eye 234, as shown in FIG. 8. The optical powered element 740 also spreads the incident light beam 730 to create a spread light beam shown at 742. This spread light beam 742 uniformly illuminates the user's eye 234. The beam 742 is pattered as shown in FIG. 10.

At block 1206, the eye tracker 713 determines the gaze direction 230 of the user's eye 234 as shown in FIG. 5 by using the reflected light pattern of infrared light. Only one light source located in the left chuck is used to determine the eye gaze direction 230. The light source being positioned in the left chunk 110A is easier to manufacture and less expensive than including in the eyewear frame.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:
   a frame;
   a see-through display supported by the frame, the see-through display including a display, a transparent cover, and a reflective optical element spaced from the display and laminated to the transparent cover; and
   a light emitter configured to emit a single collimated non-visible light beam in one direction directly toward the reflective optical element of the see-through display spaced from the display;
   wherein the reflective optical element is configured to reflect and spread the single collimated non-visible light beam received from the one direction over a pupil and iris of a user's eye.

2. The eyewear of claim 1, wherein the collimated non-visible light beam is a collimated infrared light beam.

3. The eyewear of claim 1, wherein the light emitter is coupled to a first side of the eyewear adjacent the frame.

4. The eyewear of claim 1, further comprising an eye tracker comprising the light emitter configured to emit a pattern of infrared light, and an infrared camera configured to capture reflection variations in the emitted pattern of infrared light to determine a gaze direction of the user's eye.

5. The eyewear of claim 1, wherein the reflective optical element is optically powered.

6. The eyewear of claim 1, wherein the reflective optical element is configured to uniformly illuminate the user's eye with the spread non-visible light beam.

7. The eyewear of claim 1, wherein the reflective optical element comprises a holographic element.

8. The eyewear of claim 7, wherein the holographic element is tuned to a wavelength of the non-visible light beam.

9. The eyewear of claim 7, wherein the holographic element is tuned to an angle to the incident non-visible light beam with respect to the holographic element.

10. The eyewear of claim 1, wherein the see-through display further comprises:
a first spacer positioned on a first side of the display between the display and the transparent cover that creates a first air gap in which the reflective element is spaced from the transparent cover.

11. The eyewear of claim 10, wherein the see-through display further comprises:
another transparent cover located on a second side of the display opposite the first side of the display; and
a second spacer positioned on the second side of the display between the display and the other transparent cover that creates a second air gap.

12. A method of configuring eyewear, the eyewear having a frame, a see-through display including a display, a transparent cover, a reflective optical element, a light emitter configured to emit a single collimated non-visible light beam in one direction directly toward the reflective optical element of the see-through display spaced from the see-through display, wherein the reflective optical element is configured to reflect and spread the collimated non-visible light beam to a user's eye, the method comprising:
directing, with the light emitter, the single collimated non-visible light beam in the one direction directly toward the reflective optical element of the see-through display spaced from the display through the transparent cover to which the reflective optical element is laminated; and
reflecting and spreading, with the reflective element, the single collimated non-visible light beam over a pupil and iris of a user's eye.

13. The method of claim 12, wherein the collimated non-visible light beam is a collimated infrared light beam.

14. The method of claim 12, wherein the light emitter is coupled to a first side of the eyewear adjacent the frame.

15. The method of claim 12, wherein the eyewear comprises an eye tracker comprising the light emitter emitting a pattern of infrared light, and an infrared camera capturing reflection variations in the emitted pattern of infrared light to determine a gaze direction of the user's eye.

16. The method of claim 12, wherein the reflective optical element uniformly illuminates the user's eye with the spread non-visible light beam.

17. The method of claim 12, wherein the reflective optical element comprises a holographic element.

18. The method of claim 17, wherein the holographic element is tuned to a wavelength of the non-visible light beam.

19. A non-transitory computer-readable medium storing program code which, when executed, is operative to cause a computing device to perform the steps of:
directing, with a light emitter, a single collimated non-visible light beam in one direction directly toward a reflective optical element of an eyewear see-through display including a display and a transparent cover to which the reflective optical element is laminated, wherein the reflective optical element is spaced from the display; and
reflecting and spreading, with the reflective optical element, the single collimated non-visible light beam over a pupil and iris of a user's eye.

20. The non-transitory computer-readable medium of claim 19, wherein the collimated non-visible light beam is a collimated infrared light beam.

* * * * *